US006587848B1

United States Patent
Aggarwal et al.

(10) Patent No.: US 6,587,848 B1
(45) Date of Patent: Jul. 1, 2003

(54) METHODS AND APPARATUS FOR PERFORMING AN AFFINITY BASED SIMILARITY SEARCH

(75) Inventors: Charu C. Aggarwal, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/520,551

(22) Filed: Mar. 8, 2000

(51) Int. Cl.$^7$ .............................................. G06F 17/30
(52) U.S. Cl. ................................. 707/3; 707/4; 707/5
(58) Field of Search ................................ 707/104, 3, 4, 707/5; 717/11

(56) References Cited

U.S. PATENT DOCUMENTS

| | | | | | |
|---|---|---|---|---|---|
| 4,358,824 A | * | 11/1982 | Glickman et al. | ..... | 364/222.81 |
| 5,778,362 A | * | 7/1998 | Deerwester | ..... | 707/5 |
| 6,216,133 B1 | * | 4/2001 | Masthoff | ..... | 707/104 |
| 6,226,792 B1 | * | 5/2001 | Goiffon et al. | ..... | 717/11 |
| 6,295,533 B2 | * | 9/2001 | Cohen | ..... | 707/5 |

OTHER PUBLICATIONS

G. Salton et al., "Introduction to Modern Information Retrieval," McGraw Hill, New York, pp. 16–20, pp. 59–71 and pp. 120–123, 1983.
C. Faloutsos, "Access Methods for Text," ACM Computing Surveys, vol. 17, No. 1, pp. 49–74, Mar. 1985.
W.B. Frakes and R. Baeza–Yates (editors), "Information Retrieval: Data Structures and Algorithms," Prentice Hall PTR, Upper Saddle River, New Jersey, pp. 44–65 and p. 422, 1992.
M.A. Hearst, "Improving Full–Test Precision on Short Queries using Simple Constraints," Proceedings of the Symposium on Document Analysis and Information Retrieval, pp. 1–16, Apr. 1996.
M. Mitra et al, "Improving Automatic Query Expansion," Proceedings of the ACM SIGIR Conference, pp. 206–214, 1998.
G. Salton et al., "Improving Retrieval Performance by Relevance Feedback," Journal of the American Society for Information Science, 41(4), pp. 288–297, 1990.
J. Xu et al., "Query Expansion Using Local and Global Document Analysis," Proceedings of the ACM SIGIR Conference, pp. 4–11, 1996.

(List continued on next page.)

Primary Examiner—Charles Rones
(74) Attorney, Agent, or Firm—Gail H. Zarick; Ryan, Mason & Lewis, LLP

(57) ABSTRACT

Methodologies are provided which use affinity lists in order to perform query retrieval more effectively and efficiently. The invention comprises a two phase method. In the first phase, we find a threshold number k of candidate documents which are retrieved by the method. In the second phase, we calculate the affinity value to each of these k documents and report them in ranked order of affinities. The first phase of finding the k most valuable candidates is accomplished using an iterative technique on the affinity lists. Once these candidates have been found, the affinity to each document in the set is obtained, and the resulting documents are rank ordered by affinity to the target document.

42 Claims, 3 Drawing Sheets

OTHER PUBLICATIONS

C.J. Crouch et al., "Experiments in Automatic Statistical Thesaurus Construction," Proceedings of the ACM SIGIR International Conference on Research and Development in Information Retrieval, pp. 77–88, 1992.

Y. Qiu et al., "Concept Based Query Expansion," Proceedings of the ACM SIGIR Conference on Research and Development in Information Retrieval, pp. 160–169, 1993.

E.M. Voorhees, "Query Expansion Using Lexical Semantic Relations" Proceedings of the ACM SIGIR International Conference on Research and Development in Information Retrieval, pp. 61–69, 1994.

C. Buckley et al., "Using Clustering and SuperConcepts Within Smart: TREC 6," Proceedings of the TREC Conference, 15 pages, 1998.

R. Agrawal et al., "Fast Algorithms for Mining Association Rules," Proceedings of the ACM SIGMOD Conference, pp. 487–499, 1994.

C.-H. Chang et al., "Enabling Concept–Based Relevance Feedback for Information Retrieval on the WWW," IEEE Transactions on Knowledge and Data Engineering, vol. 11, No. 4, pp. 595–609, Jul./Aug. 1999.

S.T. Dumais et al., "Using Latent Semantic Analysis to Improve Access to Textual Information," ACM, pp. 281–285, 1988.

J.J. Rocchio, Jr., "Relevance Feedback in Information Retrieval," The Smart Retrieval System: Experiments in Automatic Document Processing, pp. 313–323, 1971.

Y. Jing, "Automatic Construction of Association Theasurus for Information Retrieval," Integr. Study Artificial Intelligence and Cognitive Science Appl. Epistomel. (Belgium), vol. 15, No. 1–2, pp. 7–34.

* cited by examiner

US 6,587,848 B1

METHODS AND APPARATUS FOR PERFORMING AN AFFINITY BASED SIMILARITY SEARCH

FIELD OF THE INVENTION

The present invention is related to methods and apparatus for performing similarity searches in documents and, more particularly, to performing such searches based on affinity lists.

BACKGROUND OF THE INVENTION

In recent years, the importance of performing interactive searches on large collections of text has increased considerably because of the rapid increase in the size of the world wide web. Many search engines, such as Yahoo! (http://www.yahoo.com), Lycos (http://www.lycos.com) and AltaVista (http:///www.altavista.com), are available in which closest sets of matches are found to sets of keywords specified by the user. For such applications, the documents searched are represented in the form of an inverted index, see, Salton G., McGill M. J., "Introduction to Modern Information Retrieval," McGraw Hill, New York, 1983. Other access methods such as signature files exist (see, e.g., Faloutsos C., "Access Methods for Text," ACM Computing Surveys 17, Mar. 1, 1995); Frakes W. B., Baeza-Yates R. (editors), "Information Retrieval: Data Structures and Algorithms," Prentice Hall PTR, Upper Saddle River, N.J., 1992), though the inverted representation seems to have become the method of choice in the information retrieval domain. The inverted representation consists of lists of document identifiers, one for each word in the lexicon. For each word w, its list contains all the document identifiers, such that the corresponding documents contain that word. In addition, meta-information on word-frequency, position, or document length may be stored along with each identifier. For each user query, it suffices to examine the document identifiers in the inverted lists corresponding to the words in the query (or target).

Considerable correlations between words exist because of synonymity and different descriptions of the same underlying latent concepts. Thus, two documents containing very different vocabulary could be similar in subject material. Similarly, two documents sharing considerable vocabulary could be topically very different. While applying the method to search engines (which is a special application of similarity search, in which the target document contains very few words), this problem is observed in the form of retrieval incompleteness and inaccuracy. For example, while querying on cats, one may miss documents containing a description on the feline species, which do not explicitly contain the word "cat." Methods exist for query extension via adhoc feedback, relevance feedback, or automatic expansion, see, e.g., Hearst M. A., "Improving Full-Text Precision on Short Queries using Simple Constraints," Proceedings of the Symposium on Document Analysis and Information Retrieval, April 1996; Mitra M., Singhal A., Buckley C., "Improving Automatic Query Expansion," Proceedings of the ACM SIGIR Conference 1998, pages 206–214; Rocchio J. J., "Relevance feedback in Infomation Retrieval," Journal of the American Society for Information Science, 34(4), 262–280; Salton G., Buckley C., "Improving Retrieval Performance by Relevance Feedback," Journal of the American Society for Information Science, 41(4):288–297, 1990; and Xu J., Croft W. B., "Query Expansion Using Local and Global Document Analysis," Proceedings of the ACM SIGIR Conference, 1996. Another well known problem is that of polysemy, in which the same word could refer to multiple concepts in the description. For example, the word "jaguar" could refer to an automobile, or it could refer to the cat. Clearly, the ambiguity of the term can be resolved only by viewing it in the context of other terms in the document.

A well known method for improving the quality of a similarity search in text is called Latent Semantic Indexing (LSI) in which the data is transformed into a new concept space, see, e.g., Dumais S., Furnas G., Landauer T., Deerwester S., "Using Latent Semantic Indexing to Improve Information Retrieval," Proceedings of the ACM SIGCHI 1988, pages 281–285. This concept space depends upon the document collection in question, since different collections would have different sets of concepts. Latent semantic indexing is a technique which tries to capture this hidden structure using techniques from linear algebra. The idea in LSI is to project the data into a small subspace of the original data such that the noise effects of synonymy and polysemy are removed. A more detailed description may be found in, e.g., Kleinberg J., Tomkins A., "Applications of Linear Algebra in Information Retrieval and Hypertext Analysis," Proceedings of the ACM SIGMOD Conference, 1999.

LSI transforms the data from the sparse indexable representation (with the inverted index) in a very high overall dimensionality to a representation in the real space which is no longer sparse. Even though the new representation is of much lower overall dimensionality (typically about 200 or so dimensions are needed to represent the concept space), it is beyond the capacity of spatial indexing structures to handle effectively. R-Trees are discussed in, e.g., Guttman, A., "R-Trees: A Dynamic Index Structure for Spatial Searching," Proceedings of the ACM SIGMOD Conference, 47–57, 1984.

Most of the existing art in improving search engine performance has been on the modification of user queries in order to improve the quality of the results. These techniques generally fall into two broad categories: (i) global document analysis, and (ii) local document analysis, see, e.g., Xu J., Croft W. B., "Query Expansion Using Local and Global Document Analysis," Proceedings of the ACM SIGIR Conference, 1996. In global analysis, the relationships of the words in the document collection are used in order to expand the queries, see, e.g., Crouch C. J., Yang B., "Experiments in Automatic Statistical Thesaurus Construction," Proceedings of the ACM SIGIR International Conference on Research and Development in Information Retrieval," pages 77–88, 1992; Jing Y., "Automatic Construction of Association Thesaurus for Information Retrieval," Integr. Study Artificial Intelligence and Cognitive Science Appl. Epistomel. (Belgium), Vol. 15, No. 1–2, pp. 7–34, 1998; Qiu Y., Frei H. P., "Concept Based Query Expansion," Proceedings of the ACM SIGIR Conference on Research and Development in Information Retrieval, pages 160–169, 1993; and Voorhees E., "Query Expansion Using Lexical Semantic Relations," Proceedings of the ACM SIGIR International Conference on Research and Development in Information Retrieval, pages 61–69. The more popular method for query expansion is local analysis, in which the top ranked documents returned by the original query are assumed relevant, see, e.g., Buckley C., Mitra M., Walz J., Cardie C., "Using Clustering and SuperConcepts Within Smart: TREC 6," Proceedings of the TREC Conference, 1998; Mitra M., Singhal A., Buckley C., "Improving Automatic Query Expansion," Proceedings of the ACM SIGIR Conference 1998, pages 206–214; Rocchio J. J., "Relevance feedback in Infomation Retrieval," Journal of the American Society for Information Science, 34(4), 262–280; Salton G., Buckley C., "Improving Retrieval Performance by Relevance Feedback," Journal of the American Society for Information Science, 41(4):288–297, 1990. Terms from these returned documents are then used in order to expand the user queries. In addition, boolean filters may be used in order to decide the relevance of the documents in the returned results, see, e.g., Hearst M. A., "Improving Full-Text Precision on Short Queries Using Simple Constraints," Proceedings of the Symposium on Document Analysis and Information Retrieval, April 1996. These techniques are relevant to short user queries only, because for the case of very large documents the subject can be inferred only from the overall distribution of words in the initial document, and the initial query itself may have a considerable number of words which are unrelated to the document content. Furthermore, we will see that the inverted representation is not suitable from the performance perspective for large document targets. This also means that the process of feedback (which often requires repeated queries for modified targets) may be infeasible.

Accordingly, a need exists for methods and apparatus for performing similarity searches in a search engine so that the quality of results of the search engine are less sensitive to the choice of search terms.

SUMMARY OF THE INVENTION

This present invention provides methods and apparatus for performing similarity searches in a search engine so that the quality of results of the engine are less sensitive to the choice of search terms. This is accomplished by improved methodologies for performing affinity based similarity searches. Traditional search engines have the disadvantage of not being able to find documents with related search terms effectively. This invention overcomes this issue by performing an iterative search on the optimal query generation so as to create the best possible query results. It is to be appreciated that the term "affinity" as used herein is a measure of how likely it is that a term y will occur in a document when the term x is also present in the document. Thus, affinity is based on the relative presence of terms in the lexicon of terms of documents used in the search. The affinity between two documents is the average pairwise affinity between any pair of terms in the two documents. These concepts will be explained in greater detail below.

In the present invention, methodologies are provided which use affinity lists in order to perform query retrieval more effectively and efficiently. The invention comprises a two phase method. In the first phase, we find a threshold number k of candidate documents which are retrieved by the method. In the second phase, we calculate the affinity value to each of these k documents and report them in ranked order of affinities. The first phase of finding the k most valuable candidates is accomplished using an iterative technique on the affinity lists, which will be explained in detail below. Once these candidates have been found, the affinity to each document in the set is obtained, and the resulting documents are rank ordered by affinity to the target document.

One important advantage of using this technique over the existing art is that the invention takes into account words which are not included in the query but are indeed relevant. For example, while querying on "jaguars," one may also add a word or words, such as "cars," which increase the specificity and effectiveness of the query.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
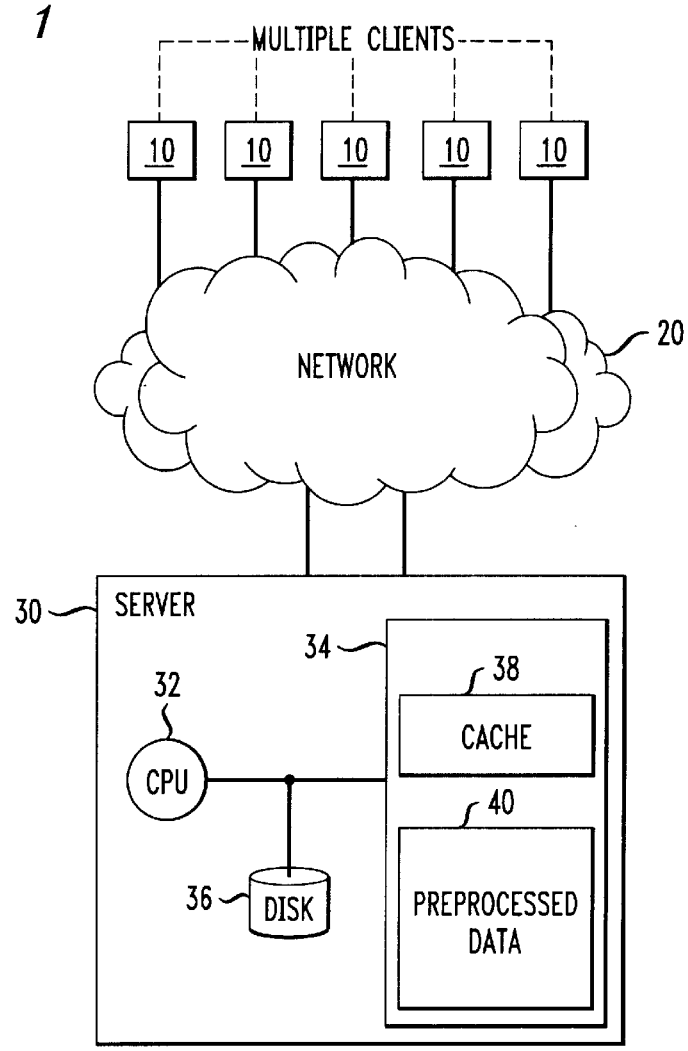
FIG. 1 is a block diagram illustrating a hardware implementation suitable for employing affinity based similarity searching methodologies according to an embodiment of the present invention.

The detailed description will be divided into the following sections for ease of reference: (I) Definitions and Notations; and (II) Illustrative Embodiments.

I. Definitions and Notations

In this section, we discuss methods for document representation, normalization, and similarity measures. A well known method for document representation is called the vector space format. In this case, each document is represented by a vector of terms. Each term corresponds to a word in the dictionary of possibilities. Thus, the length of the vector for a given document is equal to the total number of words or terms in the dictionary of possibilities from which the terms are drawn. The value of each element in this vector is equal to the weight of the corresponding word. This weight represents the "relative importance" of the word in that document. Typically, the weight of the word in a document depends upon the frequency of the word in that document and a number which we refer to as the normalization factor for the word. We will discuss below how the normalization of the weights of the different words may be done.

In order to understand the vector space format better, let us consider the case when the documents are drawn from the set of 6 terms: A, B, C, D, E, and F. In typical applications, the total lexicon of terms could be of the order of several thousand words. For the purpose of this example:

Let us consider the two documents X and Y. Let us say that the documents X and Y contain the following terms:

Document X: A with frequency 2, C with frequency 4, D with frequency 5, F with frequency 3.

Document Y: B with frequency 3, D with frequency 7, and E with frequency 5.

If the weight of a term is equal to its frequency in the documents, then the vector space representation for documents X and Y are as follows:

Vector=(A, B, C, D, E, F)

Document X=(2, 0, 4, 5, 0, 3)

Document Y=(0, 3, 0, 7, 5, 0)

The above example illustrates a vector length of only six. In real applications, the number of terms from which the documents are drawn could be of the order of several tens of thousands. Correspondingly, the vector for each document would also be of this similar size of several thousand words. Since each document contains a relatively small number of words, the technique represents the data rather sparsely. Thus, most of the term weights are equal to zero. Correspondingly, the data structure representations of the documents can also be represented in sparse format, where lists are maintained for each document. The list for a document contains the set of words in it along with the corresponding weights.

Another important representation is called the "inverted representation" of documents. As mentioned above, the inverted representation consists of lists of document identifiers; one for each word in the lexicon. For each word w, its list contains all the document identifiers such that the corresponding documents contain the word. In addition, meta-information on word frequency, position or document length may be stored along with each identifier. For each user query, it suffices to examine the document identifiers (IDs) in the inverted lists corresponding to the words in the query. Details on how the similarity function is actually calculated for the relevant documents may be found in Salton G., McGill M. J., "Introduction to Modern Information Retrieval," McGraw Hill, New York, 1983, the disclosure of which is incorporated herein by reference. For each term x, we assume that the corresponding inverted list is denoted by I(x).

Further, in accordance with the present invention, we define the concepts of "affinity" and "affinity lists." An affinity value is defined for a pair of search terms as A(x, y) and is defined to be a measure of how likely it is that the term y will occur in a document when the term x is also present. The exact value of A(x, y) for a given document collection is computed as follows:

$$A(x, y) = \text{(Number of documents containing both } x \text{ and } y\text{)}/\text{(Number of documents containing only term } x\text{)}$$

The number of documents in the collection containing a given term is referred to as the "support." Note that the calculation of affinity is not symmetric. Therefore, A(x, y) is not equal to A(y, x). Other techniques are possible for creation of affinity lists. Thus, in the above definition, the affinity value will always lie in the range (0, 1). An affinity list L(x) is defined for each term in the collection, and is equal to the list of terms in the lexicon for which the value of A(x, y) is above a certain threshold value.

The affinity between two documents is the average pairwise affinity between any pair of terms in the two documents. For example, let D1 be a document with terms {t1, t2, t3} and D2 be another document with terms {t4, t5, t6}. Let the fractional presences of terms t1, t2, . . . , t6 in the entire collection be given by f1, f2, . . . , f6, respectively. Then, the affinity from document D1 to document D2 is given by:

$$f1.f4.A(t1, t4)+f1.f5.A(t1, t5)+f1.f6.A(t1, t6)+ \ldots$$

$$f2.f4.A(t2, t4)+f2.f5.A(t2, t5)+f2.f6.A(t2, t6)+ \ldots$$

$$f3.f4.A(t3, t4)+f3.f5.A(t3, t5)+f3.f6.A(t3, t6)$$

where, for example, f1.f4.A(t1, t4) refers to the dot product of the fractional presence f1, the fractional presence f4 and the affinity value for the pair of terns t1 and t4.

II. Illustrative Embodiments

The following description will illustrate the invention using an exemplary document search system. It should be understood, however, that the invention is not limited to use with any particular search system architecture. The invention is instead more generally applicable to any search system in which it is desirable to perform similarity searches in accordance with a search engine so that the quality of the results of the search engine are less sensitive to the choice of search terms.

Referring initially to FIG. 1, an exemplary architecture suitable for employing the present invention is shown. As illustrated, an exemplary system comprises client devices 10 coupled, via a large network 20, to a server 30. The server 30 may comprise a central processing unit (CPU) 32, coupled to a main memory 34 and a disk 36. The main memory 34 may comprise a cache 38 and preprocessed data 40. It is assumed that multiple clients 10 can interact with the server 30 over the large network 20. It is to be appreciated that the network 20 may be a public information network such as, for example, the Internet or world wide web, however, the clients and server may alternatively be connected via a private network, a local area network, or some other suitable network. The similarity queries originate at the client end, which are then transmitted to the server over the network. The queries are resolved at the server end and transmitted back to the client. The calculations for the similarity queries are made at the CPU 32 at the server end. In order to make these calculations, the inverted index representation of the documents should be stored at the server. This is stored either in the main memory 34 or in the disk 36 at the server end. Specifically, the inverted index representation of the documents is stored in the preprocessed data section 40 of the main memory 34 or the disk 36 at the server. The main memory 34 and disk 36 also contain the other index structures employed in accordance with the invention, namely, the affinity lists. In addition, a cache 38 is preferably present at the server end in order to speed up calculations.

Accordingly, in this illustrative embodiment, the preprocessing, query resolution and rank ordering operations of the present invention are executed in association with the server 30 in response to a search request received from a client device 10. All or a portion of the results generated in association with the server are then presented, e.g., displayed, to a user at the client device. This may be done in accordance with a web browser running on the client device. Further, in one embodiment, software components including program instructions or code for performing the methodologies of the invention, as described herein, may be stored in one or more memory devices described above and, when ready to be utilized, loaded in part or in whole and executed by the CPU.

Figure 2:
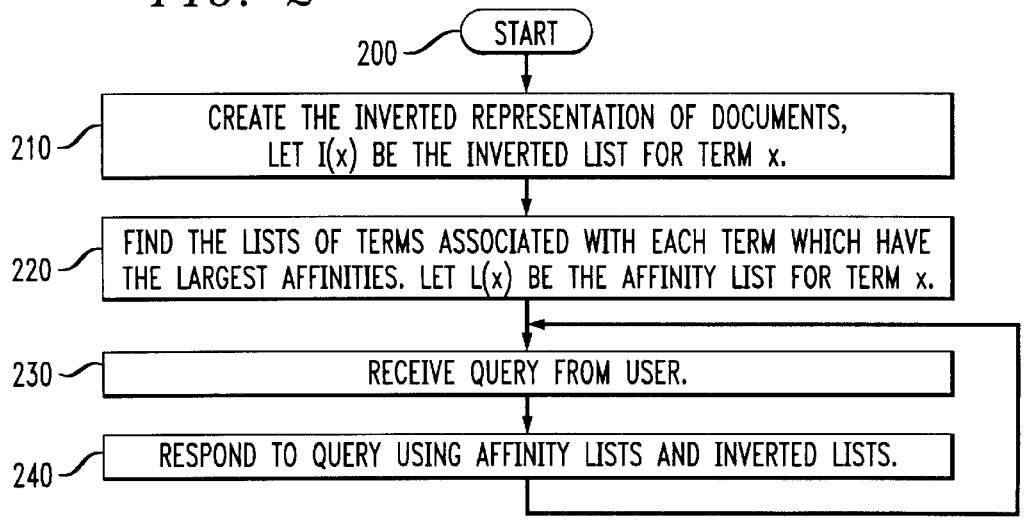
FIG. 2 is a flow diagram illustrating an overall process for preprocessing and query response according to an embodiment of the present invention.

Referring now to FIG. 2, a flow diagram illustrating an overall process for preprocessing and query response according to an embodiment of the present invention is shown. The overall process begins at block 200. The preprocessing phase involves building a set of data structures so that effective query resolution may be performed using these data structures. During the preprocessing phase, the inverted lists and affinity lists are built in steps 210 and 220. These data structures which are generated in a preprocessing method are then used in order to respond to user queries. The data structures are stored at the server end 30. The process for generating the inverted lists (step 210) is well known in the art and is described in the above-referenced article: Salton G., McGill M. J., "Introduction to Modern Information Retrieval," McGraw Hill, New York, 1983. As is known, in the inverted representation of a document collection, along with each word identifier (ID), a list of document identifiers (IDs) are stored which correspond to the documents which contain the word. I(x) refers to the inverted list for term x. A detailed description of step 220 is provided in the context of FIG. 3. Generally, we find the list of terms associated with each term which have the largest affinities. L(x) refers to the affinity list for term x. Once the preprocessing step has been completed, the user queries are received and responded to using the affinity lists and the inverted lists. This is denoted in the loop structure illustrated in steps 230 and 240. It is assumed that the user queries are initiated at the web browsers or other web interfaces available at the multiple clients which are then transmitted to the server.

Figure 3:
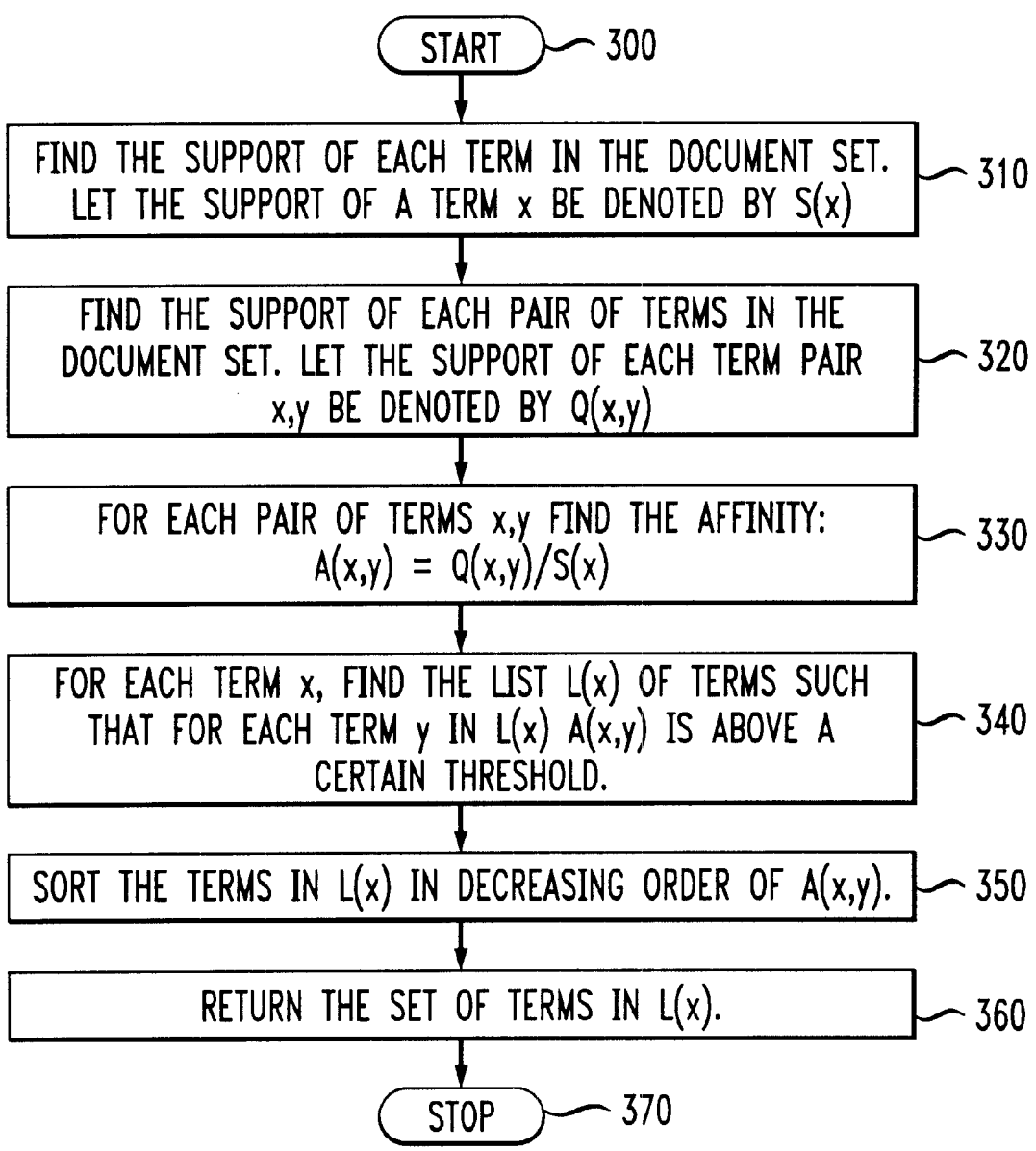
FIG. 3 is a flow diagram illustrating a preprocessing procedure for building affinity lists according to an embodiment of the present invention.

In FIG. 3, a flow diagram illustrating a preprocessing procedure for building affinity lists according to an embodiment of the present invention is shown. It is to be understood that this process corresponds to step 220 in FIG. 2. The idea is to find the words which have the greatest probability of presence in a search document which matches the specifications of the user search query. The process begins at block 300. In step 310, the support of each term in the document collection is determined. We denote the support of this term by S(x). The support for a term x may be easily obtained from the inverted lists generated in step 210 (FIG. 2). The number of documents pointed to by a term is equal to the support of that term. In step 320, the support of every pair of terms in the lexicon is determined. The support of a pair of terms is denoted by Q(x, y). The process of finding the support of a term pair is well known in the existing. art, see, e.g., Aggrawal R., Srikant R., "Fast Algorithms for Mining Association Rules," Proceedings of the ACM SIGMOD Conference, 1994, the disclosure of which is incorporated herein by reference. By way of one example, one method to determine support of a pair of terms is to scan over the database and find the percentage of transactions which contain each pair of items. Then, for each pair of terms, the affinity $A(x, y)=Q(x, y)/S(x)$ is determined in step 330. In step 330, the list of terms L(x) for each term x is determined, so that for each y in L(x), the affinity A(x, y) is above a certain user-defined threshold. In step 350, the terms in L(x) are sorted in decreasing order of A(x, y). In step 360, the terms in L(x) for each term x are returned. The process ends at block 370. Thus, the procedure in FIG. 3 shows how the affinity lists are built.

Figure 4:
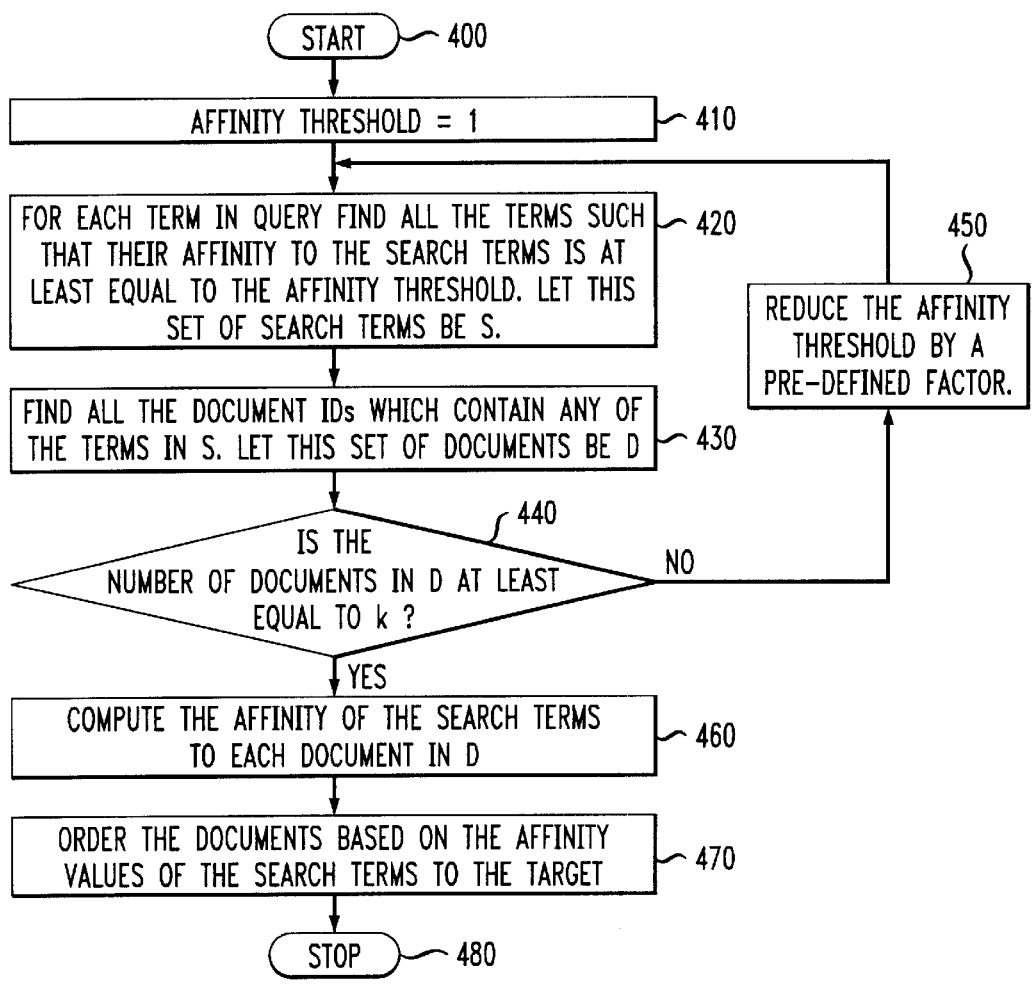
FIG. 4 is a flow diagram illustrating a query response procedure according to an embodiment of the present invention.
Figure 5:
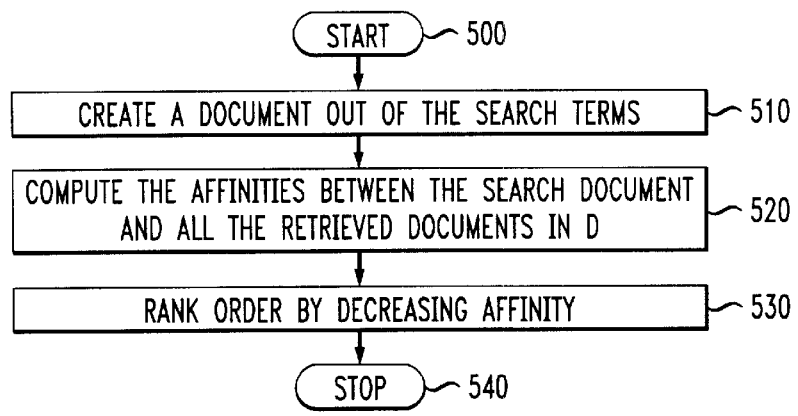
FIG. 5 is a flow diagram illustrating process of rank ordering documents based on a similarity value according to an embodiment of the present invention.

In FIG. 4, a flow diagram illustrating a query response procedure according to an embodiment of the present invention is shown. Particularly, we illustrate how a combination of the affinity lists and inverted lists are used in the search procedure. The idea is to use the affinity lists in order to reformulate the search query in a way so as to make it more effective in a two stage retrieval and ranking process. FIG. 4 illustrates the retrieval process, whereas FIG. 5 illustrates the ranking process. The retrieval process begins at block 400. In step 410, the affinity threshold is set to 1. At this stage, for each term in the query, all the terms are found such that their affinity to the search terms is at least equal to the affinity threshold. This is done in step 420. Let this set of search terms be S. Thus, in the first iteration, this corresponds to only terms in the original search query. In step 430, all the document IDs which contain any of the terms in S are found. Let this set of documents be D. This set of D documents is the candidate set which may be reported to the user. The user may set a pre-defined threshold k corresponding to the number of documents which are finally reported. In step 440, it is determined whether the number of documents in D is at least equal to k. If not, the affinity threshold is reduced by a pre-defined factor in step 450 and the process returns to step 420. In the second iteration, the search is expanded, since the affinity threshold is now reduced and more terms will be added to S. Thus, a larger number of candidate documents may be found. This process continues until at least k documents in D are obtained. Then, in step 460, the affinity of the search terms to each document in D is computed. At this point, the documents are ordered based on the affinity values of the searched results to the target query. This is done in step 470. The process ends at block 480.

The document set D represents a good candidate set of matches. It now remains to perform a re-ranking procedure in order to rank the documents more appropriately. In FIG. 5, a process for rank ordering the documents in D according to an embodiment of the present invention is shown. The document set D represents an approximate set of matches to the target document. The process begins at block 500. In step 510, a document is created out of the search terms. This document is an artificial document which contains all the words in the search query. This is called the search document. In step 520, the affinities between the search document and all the retrieved documents in D are computed. In step 530, the retrieved documents are rank ordered by decreasing affinity. The resulting matches are reported in this ranked order. The process ends at block 540.

Accordingly, as has been explained above, the present provides for a new method for affinity based similarity searching which is able to handle the inherent ambiguities and redundancies in textual descriptions, while preserving better quality search results.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of performing an affinity based similarity search, the method comprising the steps of:
   generating an affinity list for each term in a lexicon of terms of documents to be used in the similarity search;
   generating an inverted list of document identifiers for each term in the lexicon; and
   evaluating a search query using the affinity lists and inverted lists.

2. The method of claim 1, wherein a search query comprises a set of terms specified by a user.

3. The method of claim 2, wherein the set of specified terms of the search query originate from the user at a client device.

4. The method of claim 1, wherein the evaluation of the search query is performed at a server.

5. The method of claim 1, wherein the affinity lists are calculated based on the relative presence of terms in the lexicon.

6. The method of claim 5, wherein an affinity between two terms is relatively high when the two terms are present together in a document a relatively large percentage of the time that one of them is present.

7. The method of claim 5, wherein terms with the highest relative presence to a given term are used to generate the affinity list for that term.

8. The method of claim 1, wherein affinity lists generated for each term in the lexicon are used to expand an initial set of search terms until a predetermined number of matches is obtained.

9. The method of claim 8, wherein the expansion is iterative with gradual reduction of an affinity threshold.

10. The method of claim 1, wherein affinity values of the documents to the search terms are used to rank the documents.

11. The method of claim 10, wherein the affinity value of each document to a search term is calculated using the affinity of each search term to the individual documents.

12. The method of claim 11, wherein an overall affinity is calculated using a pairwise affinity of each search term and each term in the document being considered.

13. The method of claim 1, wherein at least a portion of results associated with the search query evaluation are presented to a user.

14. The method of claim 13, wherein the results are presented in association with a web browser.

15. Apparatus for performing an affinity based similarity search, the apparatus comprising:

at least one processor operative to: (i) generate an affinity list for each term in a lexicon of terms of documents to be used in the similarity search; (ii) generate an inverted list of document identifiers for each term in the lexicon; and (iii) evaluate a search query using the affinity lists and inverted lists; and memory, coupled to the at least one processor, for storing at least one of the affinity lists and the inverted lists.

16. The apparatus of claim 15, wherein a search query comprises a set of terms specified by a user.

17. The apparatus of claim 16, wherein the set of specified terms of the search query originate from the user at a client device.

18. The apparatus of claim 15, wherein the evaluation of the search query is performed at a server.

19. The apparatus of claim 15, wherein the affinity lists are calculated based on the relative presence of terms in the lexicon.

20. The apparatus of claim 19, wherein an affinity between two terms is relatively high when the two terms are present together in a document a relatively large percentage of the time that one of them is present.

21. The apparatus of claim 19, wherein terms with the highest relative presence to a given term are used to generate the affinity list for that term.

22. The apparatus of claim 15, wherein affinity lists generated for each term in the lexicon are used to expand an initial set of search terms until a predetermined number of matches is obtained.

23. The apparatus of claim 22, wherein the expansion is iterative with gradual reduction of an affinity threshold.

24. The apparatus of claim 15, wherein affinity values of the documents to the search terms are used to rank the documents.

25. The apparatus of claim 24, wherein the affinity value of each document to a search term is calculated using the affinity of each search term to the individual documents.

26. The apparatus of claim 25, wherein an overall affinity is calculated using a pairwise affinity of each search term and each term in the document being considered.

27. The apparatus of claim 15, wherein at least a portion of results associated with the search query evaluation are presented to a user.

28. The apparatus of claim 27, wherein the results are presented in association with a web browser.

29. An article of manufacture for performing an affinity based similarity search, comprising a machine readable medium containing one or more programs which when executed implement the steps of:

generating an affinity list for each term in a lexicon of terms of documents to be used in the similarity search;

generating an inverted list of document identifiers for each term in the lexicon; and evaluating a search query using the affinity lists and inverted lists.

30. The article of claim 29, wherein a search query comprises a set of terms specified by a user.

31. The article of claim 30, wherein the set of specified terms of the search query originate from the user at a client device.

32. The article of claim 29, wherein the evaluation of the search query is performed at a server.

33. The article of claim 29, wherein the affinity lists are calculated based on the relative presence of terms in the lexicon.

34. The article of claim 33, wherein an affinity between two terms is relatively high when the two terms are present together in a document a relatively large percentage of the time that one of them is present.

35. The article of claim 33, wherein terms with the highest relative presence to a given term are used to generate the affinity list for that term.

36. The article of claim 29, wherein affinity lists generated for each term in the lexicon are used to expand an initial set of search terms until a predetermined number of matches is obtained.

37. The article of claim 36, wherein the expansion is iterative with gradual reduction of an affinity threshold.

38. The article of claim 29, wherein affinity values of the documents to the search terms are used to rank the documents.

39. The article of claim 38, wherein the affinity value of each document to a search term is calculated using the affinity of each search term to the individual documents.

40. The article of claim 39, wherein an overall affinity is calculated using a pairwise affinity of each search term and each term in the document being considered.

41. The article of claim 29, wherein at least a portion of results associated with the search query evaluation are presented to a user.

42. The article of claim 41, wherein the results are presented in association with a web browser.

* * * * *